United States Patent
Whiting et al.

(10) Patent No.: US 7,406,165 B2
(45) Date of Patent: Jul. 29, 2008

(54) DIRECT ROUTE ISDN PRIMARY ROUTE INTERFACE

(75) Inventors: Timothy R. Whiting, Chicago, IL (US); Melanie Murphy, Oak Park, IL (US); Scott E. Bowers, Chicago, IL (US); Eugene J. Wagner, Schaumburg, IL (US); Gilbert Badillo, Chicago, IL (US); Uma Rao, Algonquin, IL (US); Anthony A. Haeuser, Naperville, IL (US); Dianna I. Tiliks, Elk Grove, IL (US); Gordon L. Blumenschein, Woodridge, IL (US); Carol S. Gruchala, Naperville, IL (US); Donald W. Buell, Naperville, IL (US); John W. Moss, Lake Zurich, IL (US)

(73) Assignee: SBC Properties, L.P., Reno, NV (US)

( * ) Notice: Subject to any disclaimer, the term of this patent is extended or adjusted under 35 U.S.C. 154(b) by 534 days.

(21) Appl. No.: 09/799,818

(22) Filed: Mar. 5, 2001
(Under 37 CFR 1.47)

(65) Prior Publication Data
US 2002/0122549 A1 Sep. 5, 2002

(51) Int. Cl.
*H04M 7/00* (2006.01)
(52) U.S. Cl. .................................. 379/229; 379/219
(58) Field of Classification Search ............ 379/221.02, 379/229, 45, 211.02, 211.09, 142.02, 142.01, 379/221.09, 221.08, 215.01, 112.06, 219, 379/134, 32.03; 370/259, 227, 351
See application file for complete search history.

(56) References Cited

U.S. PATENT DOCUMENTS

| | | | |
|---|---|---|---|
| 4,903,263 A * | 2/1990 | Patel et al. ................... 370/259 |
| 4,993,014 A | 2/1991 | Gordon ....................... 370/16 |
| 5,212,691 A | 5/1993 | Hokari ..................... 370/110.1 |
| 5,278,889 A | 1/1994 | Papanicolaou et al. ........ 379/53 |
| 5,331,629 A | 7/1994 | Tabata et al. .................. 370/57 |
| 5,375,124 A | 12/1994 | D'Ambrogio et al. ..... 370/110.1 |
| 5,422,943 A | 6/1995 | Coney et al. ................ 379/225 |
| 5,566,235 A | 10/1996 | Hetz ..................... 379/201.02 |
| 5,570,410 A * | 10/1996 | Hooshiari ................ 379/32.03 |
| 5,572,583 A * | 11/1996 | Wheeler et al. ........ 379/221.09 |
| 5,579,300 A | 11/1996 | Lee et al. ....................... 370/16 |
| 5,703,938 A | 12/1997 | Lucas et al. .................. 375/112 |
| 5,737,333 A | 4/1998 | Civanlar et al. ............. 370/352 |
| 5,740,237 A * | 4/1998 | Malik et al. ............. 379/211.02 |
| 5,809,130 A | 9/1998 | Ayala ..................... 379/266.01 |
| 5,818,919 A | 10/1998 | Berberich, Jr. et al. . 379/211.02 |
| 5,825,780 A | 10/1998 | Christie ....................... 370/522 |
| 5,828,652 A | 10/1998 | Bales et al. .................. 370/225 |
| RE36,051 E | 1/1999 | Adams et al. .......... 379/266.01 |
| 5,878,127 A * | 3/1999 | Fleischer, III .......... 379/221.08 |
| 5,889,846 A | 3/1999 | Ricciardi .................... 379/219 |

(Continued)

*Primary Examiner*—Thjuan K. Addy
(74) *Attorney, Agent, or Firm*—Brinks Hofer Gilson & Lione (57) ABSTRACT

A method of operating a telecommunications network includes, in one embodiment, detecting a call at an originating switch of the telecommunications network and, when a destination for the call matches a predetermined destination, routing the call on designated data trunks. When traffic on the designated data trunks exceeds a capacity threshold, the method further includes routing the call to a terminating switch using interoffice trunks and completing the call to the destination from the terminating switch.

6 Claims, 3 Drawing Sheets

U.S. PATENT DOCUMENTS

| | | | |
|---|---|---|---|
| 5,918,019 A | 6/1999 | Valencia | 395/200.57 |
| 5,920,618 A | 7/1999 | Fleischer, III et al. | 379/207.02 |
| 5,933,490 A | 8/1999 | White et al. | 379/221.01 |
| 5,949,762 A | 9/1999 | Green et al. | 370/259 |
| 6,011,838 A * | 1/2000 | Cox | 379/112.06 |
| 6,070,192 A * | 5/2000 | Holt et al. | 709/227 |
| 6,075,853 A | 6/2000 | Boeckman et al. | 379/207.02 |
| 6,084,872 A * | 7/2000 | Munson et al. | 370/351 |
| 6,108,408 A | 8/2000 | Plunkett et al. | 379/221.01 |
| 6,160,876 A * | 12/2000 | Moss et al. | 379/142.02 |
| 6,185,282 B1 * | 2/2001 | Boeckman et al. | 379/45 |
| 6,226,374 B1 * | 5/2001 | Howell et al. | 379/221.08 |
| 6,341,161 B1 * | 1/2002 | Latter et al. | 379/142.01 |
| 6,449,350 B1 * | 9/2002 | Cox | 379/134 |
| 6,526,136 B2 * | 2/2003 | Plunkett et al. | 379/221.02 |
| 6,535,598 B1 * | 3/2003 | Lehtinen | 379/219 |
| 6,697,480 B2 * | 2/2004 | Plunkett et al. | 379/221.02 |
| 6,704,405 B1 * | 3/2004 | Farris et al. | 379/215.01 |
| 6,771,761 B1 * | 8/2004 | LaPierre | 379/211.02 |

* cited by examiner

DIRECT ROUTE ISDN PRIMARY ROUTE INTERFACE

CROSS REFERENCE TO RELATED APPLICATIONS

This application is related to U.S. application Ser. No. 09/961,313, filed Oct. 30, 2004, now U.S. Pat. No. 6,084,872, entitled "Trunk and Switch Architecture For Providing Switched-Circuit Connections to On-Line Data Services," which application is commonly assigned with the present application and which is incorporated herein by reference.

BACKGROUND

The present invention relates generally to telecommunication networks. More particularly, the present invention relates to method and apparatus providing a direct route primary interface.

Companies such as internet service providers (ISPs) provide dial-up access to data networks. Local access from a subscriber is provided over conventional telephone lines. The subscriber dials an access number and the call is routed over the standard telephone network to a modem pool maintained by the network operator. From that point, high speed data communication is established over the network provider's data communication lines. For example, the network provider may operate one or more server computers which may be accessed by the subscriber's computer acting as a client. Data communication is optimized on the network operator's network.

Such networks need to be expandable and flexible to handle varying demand for access from subscribers. Heretofore, network operators have established numerous Points of Presence or POPs in an area. A POP generally is an interface between the high speed data network of the network operator and the conventional telephone network. POPs may be added to areas of high demand by associating a new POP with a new telephone number. Subscribers may then access the network through the new POP.

This solution, however, can be slow and expensive to implement. A delay is required from the time a busy POP is identified until a new POP can be established. A solution offering real-time expansion of the network and redirection of traffic would be preferred.

BRIEF SUMMARY

By way of introduction only, the present embodiments provide a method of operating a telecommunications network. In one embodiment, the method includes detecting a call at an originating switch of the telecommunications network and, when a destination for the call matches a predetermined destination, routing the call on designated data trunks. When traffic on the designated data trunks exceeds a capacity threshold, the method further includes routing the call to a terminating switch using interoffice trunks and completing the call to the destination from the terminating switch.

The present embodiments further provide a telecommunications network which in one embodiment includes an originating switch and a terminating switch. The originating switch is configured to receive a call from a calling communication station intended for a network subscriber and to route the call to a Direct Route Primary Rate Interface associated with the network subscriber. The terminating switch is associated with the network subscriber. The network further includes Direct Route Primary Rate Interface trunk groups coupling the originating switch and the terminating switch and Advanced Intelligent Network elements configured to route calls between the originating switch and the terminating switch including the call when traffic of the Direct Route Primary Rate Interface exceeds a capacity threshold.

The foregoing summary has been provided only by way of introduction. Nothing in this section should be taken as a limitation on the following claims, which define the scope of the invention.

DETAILED DESCRIPTION OF THE PRESENTLY PREFERRED EMBODIMENTS

In accordance with the embodiments disclosed herein, a direct route ISDN primary rate interface is a network capability based on the Advanced Intelligent Network ("AIN"). The disclosed system and method allow interoffice traffic destined for existing primary rate interfaces (PRIs) of a network subscriber such as an internet service provider (ISP) to be captured prior to leaving the originating switch. Traffic is re-routed over separate Direct Route PRI trunk groups established between the originating office and the ISP's modem pools. At the originating office, the call is recognized as a call for the ISP based on the called number. Instead of terminating the call to the ISP's existing PRI located, for example, in a foreign office, the AIN functionality redirects the call to the Direct Route PRI which is preferably established in the same switch as the originating call. When the Direct Route PRIs are full and additional calls are received, special translations allow the additional calls to be re-routed via interoffice trunks to the ISP's primary ISDN PRI switch.

Figure 1:
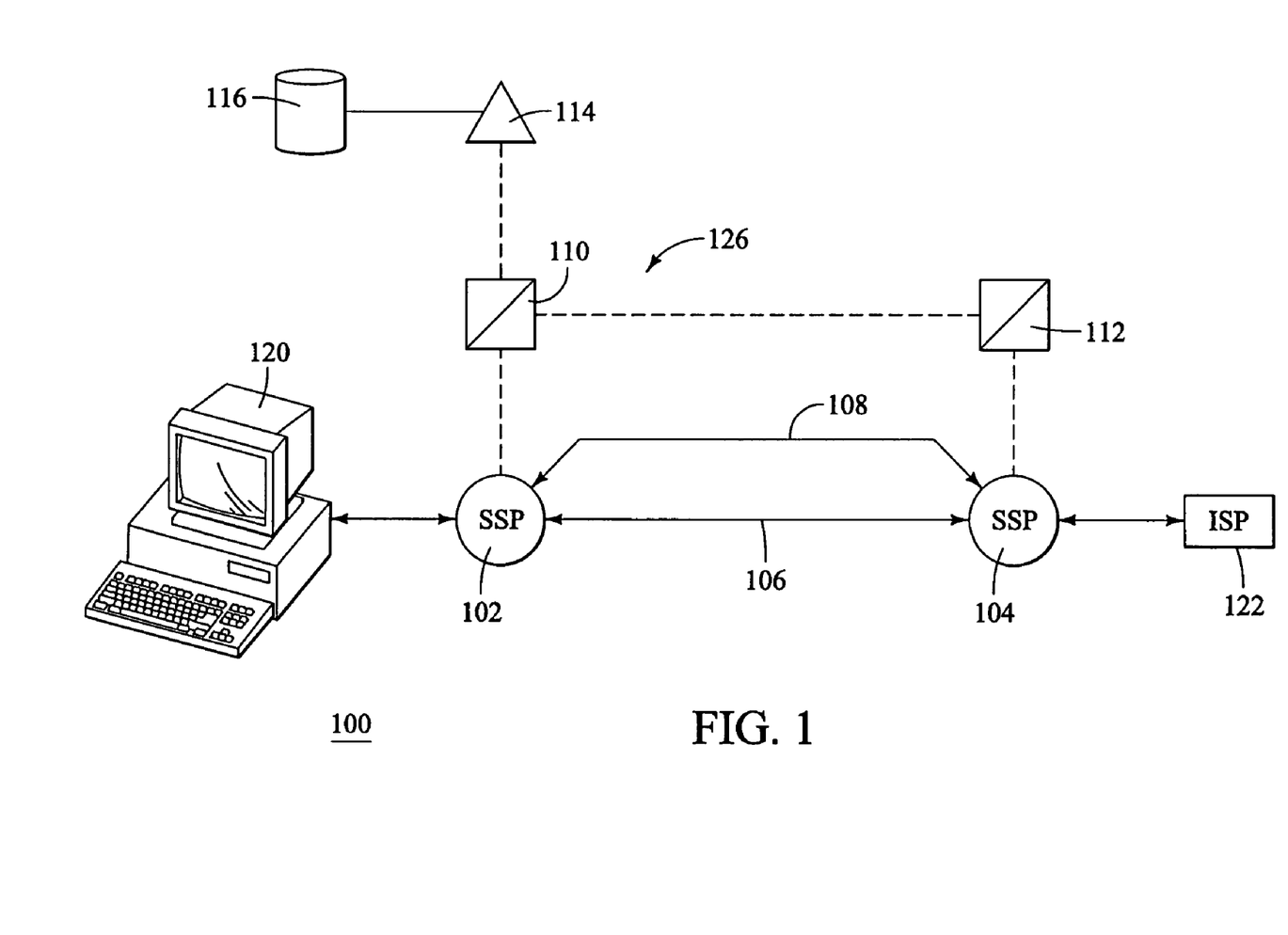
FIG. 1 is a block diagram of a telecommunications system.

Referring now to the drawing, FIG. 1 shows a telecommunications network 100. The telecommunications network 100 in one embodiment includes an originating switch 102 and a terminating switch 104, trunk lines 106 communicating telephone calls between the switches 102, 104, interoffice data trunks 108, AIN signal transfer points (STPs) 110, 112, a signal control point (SCP) 114 and an SCP database 116. It will be understood by those ordinarily skilled in the art that the network 100 may include any number of devices and communication channels among those devices. The network 100 is shown in simplified format so as to not unduly complicate the drawing figure.

The network 100 provides voice and data communication between a calling communication station 120 and computer services provided by network subscriber 122. The calling communication station 120 in the illustrated embodiment is a data device such as a personal computer. The network subscriber 122 in the illustrated embodiment is an internet service provider (ISP). The ISP in general operates a data communication network or backbone providing high speed data communication among points of the ISP's network. The ISP's network is accessed by initiating a call from the calling communication station 120 using the communication network 100. The call is completed to a modem or modem pool operated by the ISP. Facilities such as servers and data storage media operated by the ISP on the ISP's network may then be accessed by the calling communication station 120.

FIG. 1 shows a block diagram of one embodiment of a circuit-switched network 10 having dedicated equipment facilities for circuit-switching telephone calls to on-line data services. In such a circuit-switched system, a circuit connection is established and maintained for the duration of each telephone call. The originating switch 102 and the terminating switch 104 of the circuit-switched network 100 are conventional local end offices which provide conventional plain old telephone service ("POTS) to a plurality of subscribers such as the calling communication station 120. For illustration purposes, only one of the plurality of subscribers and originating offices are shown. The originating and terminating switches 102, 104 may be implemented with Lucent 5 ESS, 4 ESS, Nortel DMS-100, and Siemens EWSD switches. The originating offices may also provide higher capacity digital access service to subscribers such as Integrated Services Digital Networks ("ISDN"), Digital Subscriber Line ("DSL"), Asymmetric Digital Subscriber Lines ("ADSL"), T1 lines, etc. Preferably, the originating and terminating switches 102, 104 have advanced intelligent network ("AIN") capability and may be referred to as a Service Switching Point ("SSP"), as described further below.

Typically, the switches 102, 104 are directly interconnected with trunk lines 106. Trunk lines 106 carry telephone calls between originating offices. It should be understood that originating offices may also be connected with trunk lines accessing a tandem switch, as is known to those ordinarily skilled in the art. Tandem switches provide trunk circuits between originating offices that are not directly connected by trunk circuits.

In the present embodiment, the network subscribers 122, shown as ISPs, within a defined local service area are accessed from a single terminating office 104. Typically, the local service area is referred to as a Local Access and Transport Area or LATA. In this present embodiment, access to the network subscriber within the LATA is consolidated through the terminating switch 104. For example, all requests from ISPs for facilities to implement dial-up access lines from within a LATA are to be provisioned from the terminating switch 104. Due to local capacity considerations or the logistics of reconfiguring existing ISP connections that are serviced from other switching equipment, however, a number of ISPs may also be serviced by other switching equipment. Preferably, the terminating switch 104 provides access to the ISP using 1 Measured Business lines ("1 MB"), T1/DS1, or Primary Rate Interface ("PRI") trunks.

Interoffice data trunks 108 provide connections between the originating switch 102 and the terminating switch 104. It should also be understood, that in addition to providing data trunks and ISP access, the terminating switch 104 may also have separate voice trunks 18 to provide conventional POTS and provide the functions of an originating office. Preferably, data trunks 108 are dedicated to routing calls carrying computer data, and segregated from data trunks 106 carrying voice telephone calls. The data trunks 108 are digital high-speed trunks carrying voice band computer data traffic at a DS1 rate or higher to the ISP serviced by the terminating switch 122.

The circuit-switched network 100 uses a network common channel signaling protocol to control the initiation, routing, and termination of telephone calls. Preferably, the network operation is controlled by an advanced intelligent network ("AIN") signaling system such as Signaling System 7 ("SS7"), known and widely used throughout the PSTN in North America. Telephone services and functions may be provided using AIN for centralized control of the network operation. In the present embodiment, AIN identifies telephone calls that are destined for the network subscriber 122 and routes these calls over the data trunks 108 to the terminating switch 104. For example, the originating switch 102 uses AIN triggers and queries to identify that the called telephone number is a telephone dial-up access line to an ISP. AIN then selects a route to connect the call to the ISP switch 22 over the data trunks 24. The AIN operation of the present embodiment is described in more detailed below.

In the preferred embodiment, the originating switch 102, also referred to as an SSP in an AIN-capable system, communicates with AIN Signal Transfer Points (STP) 110, 112 and Signal Control Points (SCP) 28 to implement the AIN signaling protocol messages. The SSP forming originating switch 102 is a programmable switch programmed with AIN triggers to recognize AIN calls and launch queries to SCP 114 and receive responses in the form of data and commands from the SCP 114 to process and route calls. For example, all telephone calls to numbers associated with dial-up access to an on-line data service are programmed with an AIN trigger. In response to an AIN trigger, the originating switch 102 communicates with SCP 114 to determine how the calls are to be handled. The signaling is communicated through out-of-band signaling, or common channel signaling, over a separate signaling network 126 utilizing STPs 110, 112. STPs 110, 112 routes messages from originating offices to the SCP 114. Preferably, the STP 110, 112 uses Global Title Translations to route queries from the originating switch 102 to the SCP 114.

The SCP 114 preferably includes a microprocessor controlled computer system using computer peripherals controlled by application software implementing SS7 AIN functionality. SCP 114 typically includes a database 116 containing information about the network 100 and its subscribers. For example, the SCP database 116 maintains trunk routing information for routing calls to the terminating switch 104. The SCP 114 responds to queries from the originating offices to determine the routing of telephone calls based on information in its database 116 and information provided by the originating office 102. STPs and SCPs are available from a number of telephone switch vendors such as Lucent Technologies, Nortel, and Siemens.

In the present embodiment, the SCP database 116 stores telephone numbers that are used to allow dial-up access to an ISP which can be cross-referenced to derive a trunk route index. The trunk route index identifies a data trunk 108 to the terminating switch 104 associated with the ISP 122. The SCP database 116 may store the ISP telephone numbers and originating office information in a memory storage device such as a random access memory, a magnetic or optical disk drive. It will be recognized by those skilled in the art that a combination of different memory storage devices or other types of memory devices may also be used. The database 116 preferably stores the network information in a data record such as an array, lookup or pointer table, or other suitable data structure. For example, the ISP telephone numbers are stored in the database as 10 digit telephone numbers having the (NPA) NXX-XXXX format used in North America. The NPA is the Number Plan Area, or the area code, NXX is the Central Office Code, and XXXX is the customer line. The SCP database table also stores data uniquely identifying originating offices to be cross-referenced with the ISP telephone numbers to derive a route index. The SCP database 38 preferably contains a routing table for each LATA.

The SCP database 116 may also maintain a number of other parameters to control the routing operation of ISP calls. For example, the SCP database 116 may include a LATA routing disabling parameter that disables the routing of calls to ISPs over the dedicated data trunks throughout the LATA. Using this parameter, the routing of ISP calls can be rapidly disabled on a LATA-wide basis. Calls accessing on-line data services are then switched as ordinary voice telephone calls. Similarly, parameters indicating whether the routing of ISP calls is enabled for a point code of an originating office or the ISP access number should also be available for quickly disabling the ISP routing on an originating office or switch basis. In addition, a parameter can also identify the proper coding for the PrimaryTrunkGroup parameter based on the switch code. The parameter should define the length, Justification and fill for the PrimaryTrunkGroup.

In accordance with the present embodiments, the network 100 is configured to detect a call at an originating switch as described above. Further, the network 100 is configured to route the call on designated data trunks 108 when the destination for the call matches a predetermined destination. The destination may be determined in any suitable manner. However, in the preferred method, the call is recognized as a call intended for the ISP 122 based on the called number associated with the call. The originating switch 102 detects the called number and routes the call to the designated data trunks 108 and thence to the terminating switch 104.

Thus, based on the called number, the call is directed to a Direct Route Primary Rate Interface established at the same switch 102 as the originating call. A Primary Rate Interface (PRI) is defined in the context of the Integrated Services Digital Network. In ISDN, there are two level of service. The Basic Rate Interface (BRI) is intended for the home and small enterprises. The PRI is intended for larger users. Both rates includes a number of B channels and a D channel. A B channel carries data, voice and other services. A D channel carries control and signaling information. The PRI channels are carried on a T-carrier system line. The PRI consists of twenty three 64 Kbps B channels and one 64 Kbps D channel. Thus, a PRI on a T-1 line can have up to 1.544 Mbps service. PRI uses the Q.931 protocol over the D channel. The twenty three B channels can be used flexibly and reassigned when necessary to meet special needs. The Primary Rate user is generally hooked up directly to a telephone company central office or SSP.

Further in accordance with the present embodiments, when traffic on the designated data trunks 108 exceeds a capacity threshold, the network 100 routes the call to the terminating switch 104 using the interoffice trunks 106. The capacity threshold may be defined in any suitable manner, such as by a maximum number of calls carried on the data trunk 108 or a maximum data rate on the data trunks 108, or otherwise. In the preferred embodiment, the capacity threshold is defined as 184 calls routed on the data trunks 108. This number corresponds to the 23 B channels of a PRI multiplied by eight available PRIs forming the data trunks 108. Where other size connections are available, or where more or fewer PRIs are available, the capacity threshold will vary.

Figure 2:
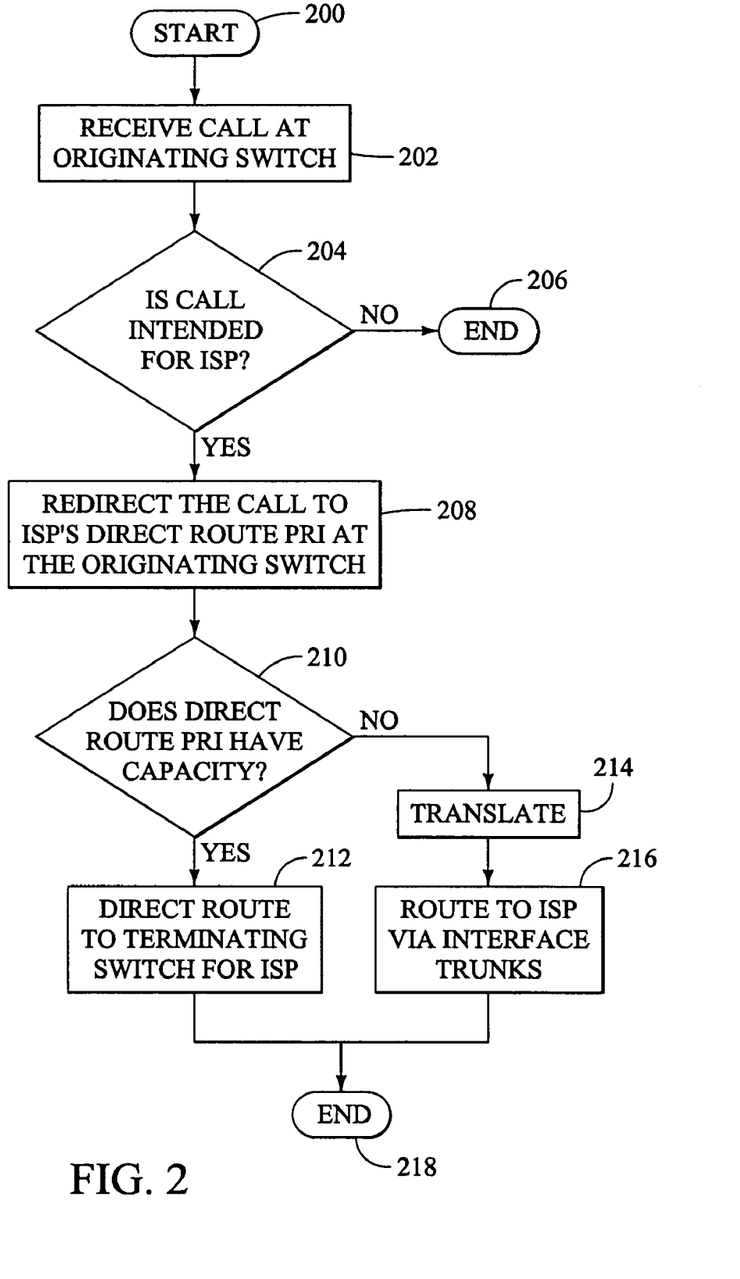
FIG. 2 is a flow diagram illustrating a method of operating the telecommunications network of FIG. 1.

FIG. 2 shows a method for operating the telecommunications system 100 of FIG. 1. The method begins at block 200. At block 202, a call is received at an originating switch. The call may originate with any telephone or other calling station in communication with the originating switch. The call may be intended for any other called communication station. The call has associated therewith a called number which designates the intended destination for the call.

The originating switch analyzes the call to determine how it should be processed. Preferably, the originating office has AIN triggers set for the ISP 122. For example, these triggers may be 3/6/10D type triggers or Termination Attempt Triggers in 5 ESS switches or DMS switches. In one embodiment, every originating office of the network 100 has a ten digit Specific Digit String (SDS) trigger provisioned for the ISP access number. At block 204, the originating switch determines if the call is intended for the ISP. When the originating office receives the digits of the number associated with the ISP 122, the SDS trigger associated with the ISP dial-up access number is triggered at block 204. If the received digits of the called number do not match the number associated with the ISP, control proceeds to block 206 and the method ends. Call processing continues normally.

If the received digits of the called number match the number associated with the ISP, control proceeds to block 208. There, the call is redirected at the originating switch to a Direct Route Primary Rate Interface (PRI) associated with the ISP. In one embodiment, processing of the call will be suspended at that point. The trigger causes the originating switch to generate an Info_Analyzed message which the originating switch sends to the SCP 114. The triggers are translated if necessary to ensure the Info_Analyzed message has the required AIN parameters to be transmitted to the SCP. For example, a 10 digit SDS trigger is required in the one embodiment. The Info_Analyzed message should also have a SCP Calling Party address field containing the point code of the originating switch. The Info-Analyzed message also preferably includes a Called Party ID which identifies the called ISP, or if 0+ dialing is used; PrimaryCarrier, which determines if the call is 2-PIC or carrier routed, and ChargePartyStationType, which determines if the call requires an operator rating.

The originating office sends the Info_Analyzed message with the appropriate parameters to the STP 110 (FIG. 1) which routes the query to the SCP 114. The originating office awaits either an Analyze_Route or Continue message response from the SCP.

The SCP receives the Info_Analyzed message and queries its database 116 for information associated with the called number to determine how the telephone call should be routed. The SCP database 116 maintains information relating to whether the called telephone number is dial-up access connection to a computer service such as an ISP. If the telephone number is assigned to a dial-up connection of the ISP 122, the call is to be routed over the data trunk 108 to the terminating switch 104. The SCP 114 identifies the originating switch 102 sending the trigger based on the point code of the originating switch. The terminating office 104 associated with the called ISP can be determined based on the dialed telephone number.

In one embodiment, the SCP 114 uses a service logic routine to determine an interoffice trunk route for the call to the terminating switch 104. The service logic routine uses a table associated with dialed directory numbers and a corresponding route index to determine a data trunk 108 from the originating switch 102 to the terminating switch 104. The trunk routes are determined by cross-referencing the originating office with the dialed telephone number. This is distinct from alternative implementations in which the AIN service logic is based on a table associated with point codes and route indices. It should be understood that many different methods may be used to determine the call routing as will be appreciated by those ordinarily skilled in the art.

If the SCP database 116 service logic is successful in determining a route to the ISP switch 22, it returns the AIN Analyze_Route message. The Analyze_Route message contains dialed telephone number. This is distinct from implementations which return a PrimaryTrunkGroup parameter identifying the trunk index or route index to which the call should be routed. If the service logic is not able to determine a route based on the parameters within the received Info_Analyzed message, it will respond with a Continue message that has no parameters. The Continue message causes the call to be handled as an ordinary voice telephone call. The service logic may be unable to determine a route for several reasons. For example, a required parameter, CalledPartyID, ChargPartyStationType, or PrimaryCarrier, may not have been present in the Info_Analyzed message received by the SCP. If all the data trunks to the ISP switch are busy, a Continue message can also be sent so that the call will overflow to normal voice trunks based on the dialed digits. In addition, several conditions may dictate that the call be handled over the voice network rather than the data trunks, such as calls originated from coin operated telephones or those the caller requests be carried by other carriers.

The Analyze_Route or Continue message is sent back to the originating office to determine if a valid Analyze_Route message specifying the data trunk was received. If a valid Analyze_Route was received, the originating office routes the call based on the called number. A circuit-switched connection to carry computer data is established between the originating office and the terminating office over the dedicated data trunks identified by the Analyze_Route message. If a valid Analyze_Route message was not received, the call is routed as an ordinary voice telephone call.

At block 210, it is determined if the Direct Route PRI for the ISP 122 has capacity to handle the additional dial-up call. If so, at block 212, a direct route is established to the terminating switch 104 associated with the ISP 122. The call is established as a packet-switched call in which a virtual circuit connection uses transmission resources only when data is actually transmitted, rather than maintaining a connection for the duration of the telephone call as in a circuit-switched call. The call allows two-way traffic, which is an enhancement over previous implementations which were not two-way. The method ends at step 218.

If the Direct Route PRI does not have capacity, at block 214, appropriate translations are made, if necessary. At block 216, the call is routed to the terminating switch 104 associated with the ISP 122 via the interoffice trunks 106. A circuit-switched call is set up over the interoffice trunks 106 to handle the call when the capacity of the direct route PRI is exceeded. The call allows two-way traffic.

Figure 3:
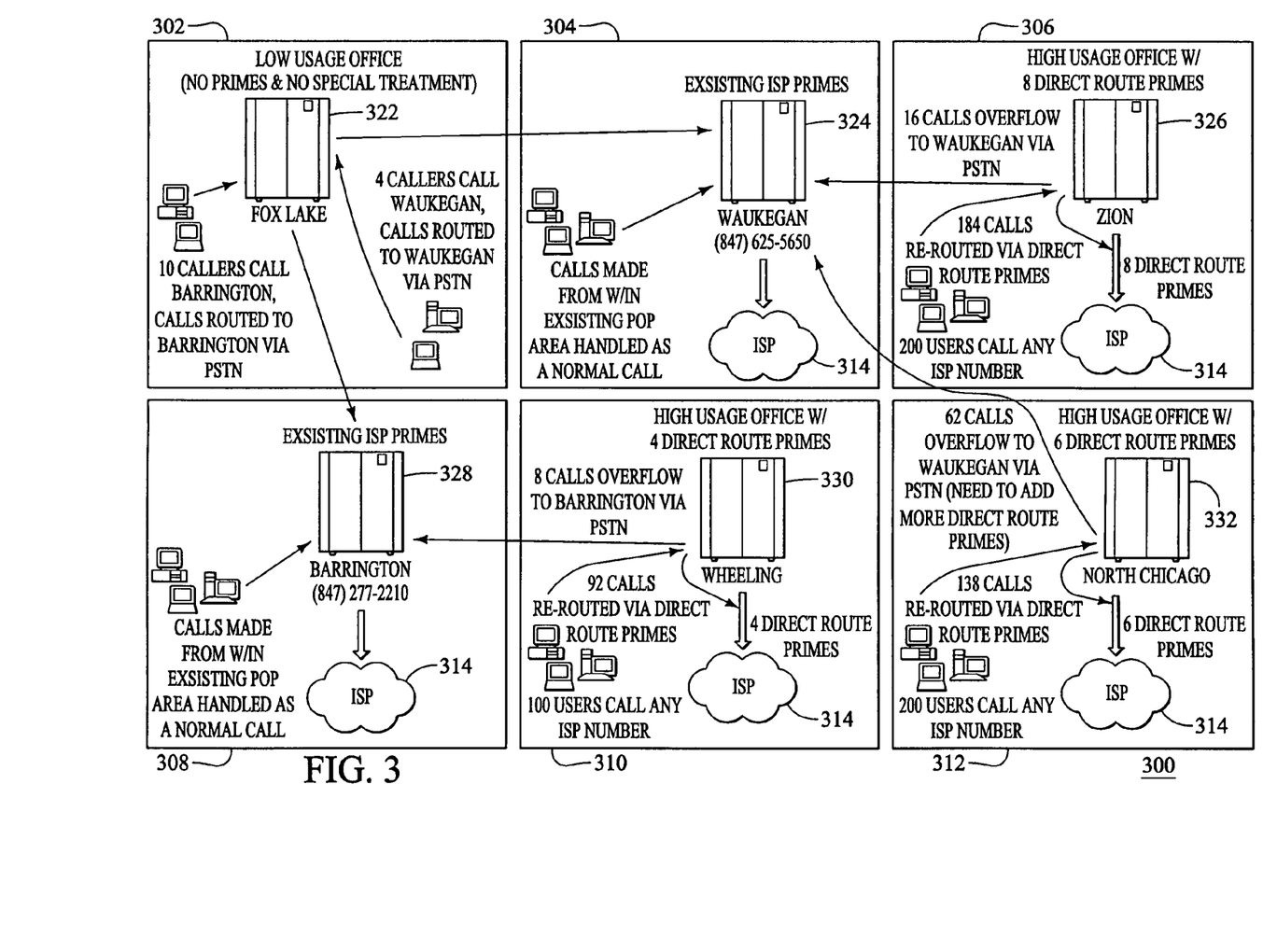
FIG. 3 is a block diagram illustrating operation of the telecommunications network of FIG. 1.

FIG. 3 is a block diagram illustrating operation of the telecommunications network of FIG. 1. FIG. 3 shows operation of the telecommunications network in several service to route calls to Direct Route Primary Route Interfaces (PRI) associated with an internet service provider (ISP) and, when a capacity threshold is reached, to redirect calls to the PSTN. FIG. 3 illustrates a telecommunications network 300 which is divided into a plurality of service areas, including service area 302, service area 304, service area 306, service area 308, service area 310 and service area 312. Each service area corresponds to a geographic region which is provided with telecommunications service by the telecommunications network 300. Each service area may correspond, for example, with a Local Access and Transport Area (LATA). Alternatively, each service area may correspond to a point of presence (POP) of an internet service provider or other computer service provider operating a data communication network.

Each service area includes at least one end office or switch. Thus, service area 302 includes a switch 322; service area 304 includes a switch 324; service area 306 includes a switch 326; service area 308 includes a switch 328; service area 310 includes a switch 330; and service area 312 includes a switch 332. Each switch has associated therewith in FIG. 3 a name. For example, switch 322 is associated with the name Fox Lake and switch 324 is associated with the name Waukegan. The switches 322, 324, 326, 328, 330, 332 are preferably embodied as originating switch 102 and terminating switch 104 described above in conjunction with FIG. 1.

FIG. 3 illustrates call behavior with AIN triggers and overflow translations when processing calls from a number of calling communication stations to access an network 314 operated by an internet service provider (ISP). FIG. 3 illustrates this operation for varying levels of usage or congestion on the network. E In the first service area 302, the switch 322 is in a low usage condition. In a low usage state, relatively few calls are made to the switch. Since switch 322 is a low usage office, the ISP has not installed a Primary Rate Interface (PRI or prime) at this switch. For dial-up access to the data communication network operated by the ISP, a caller must access a PRI of the ISP. As shown in FIG. 3, in service area 302, ten callers place calls to switch 328, labeled Barrington. This is achieved by dialing the directory number (DN) (847) 277-2210associated with the Primary Rate Interface or POP of the ISP established at switch 328. The call is initially received at switch 322, serving as the originating switch for the call. Using standard AIN triggers and functionality, the call is routed to the terminating switch, switch 328. At switch 328, the call is coupled to the PRI operated by the ISP. Similarly, four callers in the service area 302 place calls to switch 324, labeled Waukegan, by dialing its assigned DN (847) 625-5650. Switch 322 also acts as the originating switch for these calls and, using appropriate AIN functionality, routes the calls to switch 324. At switch 324, the calls are coupled to the PRI of the ISP and from there to the network 314 operated by the ISP.

In service area 304, the ISP has established one or more existing Primary Rate Interfaces at the switch 324. This switch 324 receives the calls routed over the AIN network from switch 322 as well as calls made from within the POP area or service area 304. These calls are all initiated by dialing the DN associated with the PRI, (847) 625-5650. Further, the switch 324 handles overflow calls from switch 326 and witch 332 as will be described below.

In service area 306, the switch 326 labeled Zion is a high usage office with eight direct route Primary Rate Interfaces. As described above, each PRI provides 23 B channels which may be assigned to handle calls intended for the ISP network 314. The switch 326 receives two hundred calls from within the service area 306. Of these calls, 184 calls are re-routed over direct route PRIs to the ISP network 314. That is, when one of the 184 calls is received at the switch 326, the directory number or called number is analyzed. Since the called number matches the number associated with the PRI for the switch 326, the call is routed to the direct route PRI of the ISP for connection to the network 314 of the ISP. Upon receipt of the call, a trigger is generated and a query message is sent to the SCP servicing the switch 326. The switch 326 detects that the direct route PRI has capacity (for one of the 184 calls) and returns a message with the directory number of the direct route PRI at the Zion switch 326. The switch 326 routes the call to this DN and the PRI of the ISP. The call does not leave the switch 326.

The remaining sixteen calls received at the switch 326 for the ISP PRI overflow to switch 324 serving service area 304 and labeled Waukegan. That is, when one of the sixteen calls is received at the switch, it is intended for a destination having a directory number associated with the direct route PRI of the ISP at the switch 326. When this directory number is passed in an Info_Analyzed message to the servicing SCP, in the manner described above, the SCP detects the capacity condition at the switch 326 and determines that the direct route PRI at that switch can handle no more calls. Therefore, the SCP returns an Analyze_Route message including the directory number (DN) of the switch to which the overflow call should be routed. In the illustrated example, the SCP returns a message with the DN (847) 625-5650, corresponding to the PRI at the switch 324, which has capacity to handle additional calls.

At service area 308, the switch 328 includes one or more existing ISP PRIs. The switch 328 receives calls from within the service are 308 which are handled as normal calls. That is, the called number associated with the call is analyzed to determine the destination and the call is routed directly to the direct route PRI associated with the network 314 of the ISP. In addition, the switch 328 receives calls from other service areas such as service area 302 which lack installed PRIs. Still further, the switch receives overflow calls from other service areas such as service area 310.

At service area 310, the switch 330 is a high usage office with four direct route Primary Route Interfaces. This switch is labeled Wheeling. The switch 330 receives 100 calls from users within the service area 310 seeking dial-up access to the network 314 operated by the ISP. With four direct route PRIs, the switch 330 can directly handle 92 calls on the 23 channels per PRI. The remaining eight calls overflow to another switch having PRI capability for accessing the ISP network 314.

The overflow calls are routed using AIN functionality on the PSTN, by connecting the calls between the switch 330 and the switch 328. When an overflow call is received at the switch 330, a query message is generated by the switch 330 and sent to the SCP which services the switch 330. The SCP determines the overflow condition and locates another PRI with capacity to handle the overflow call. The SCP returns the DN of the PRI to the switch 330. The switch 330 routes the call to the switch 328 using AIN functionality and the DN for the PRI.

At service area 312, the switch 332 is a high usage office with six direct route PRIs. In the illustrated example, this switch 332 receives 200 calls from users seeking access to the network 314 operated by the ISP. The six direct route PRIs have a capacity of 138 calls and this number of calls is routed to the direct route PRIs at the switch 332. Upon receipt of overflow calls, the network 300 identifies a PRI having unused capacity for handling additional calls. In the example, the network 300 identifies switch 324 in service area 304 as having sufficient capacity. Accordingly, the sixty-two overflow calls are routed from switch 332 to switch 324 over the PSTN using AIN functionality.

From the foregoing, it can be seen that the present invention provides method and apparatus for managing call traffic in a telecommunication network. Calls to a Primary Rate Interface of a computer services provider are handled directly at the originating switch if possible. In the event of overflow, when the number of calls to the direct route PRI exceeds capacity, the overflow calls are routed to another switch of the network having one or more direct route Primary Route Interfaces associated with the computer services provider. This solution provides the capability for traffic to overflow to the public switched telephone network (PSTN), which previous systems did not. Further, the Advanced Intelligent Network (AIN) logic for this solution will return the dialed telephone number. Previous systems returned a substituted telephone number and/or a route index. Still further, in this solution, AIN service logic will be based on a table associated with dialed directory numbers and a corresponding route index. Previous systems used service logic based on a table associated with point codes and route indices. This solution allows two-way traffic, which the previous system did not. Lastly, this solution provides a dedicated direct route Primary Route Interface.

While a particular embodiment of the present invention has been shown and described, modifications may be made. It is therefore intended in the appended claims to cover such changes and modifications which follow in the true spirit and scope of the invention.

What is claimed is:

1. A telecommunications network comprising:
an originating service switching point (SSP) configured to receive a call from a calling communication station intended for a network subscriber and to generate a call routing query in response to the received call;
a terminating SSP associated with the network subscriber;
interoffice trunk lines coupling the originating SSP and the terminating SSP;
Direct Route Primary Rate Interface trunk groups coupling the originating SSP and the terminating SSP; and
a signal control point (SCP) including an SCP database, the SCP in communication with the originating SSP and configured to receive the call routing query and, in response thereto, to derive a trunk route index from the SCP database, the trunk route index identifying a data trunk to a terminating switch associated with the network subscriber; the SCP returning to the originating SSP call routing information based on the derived trunk route index directing the call to a Direct Route Primary Rate Interface established at the originating SSP, wherein the SCP database further stores a capacity threshold associated with the network subscriber and, when traffic on the Direct Route Primary Rate Interface trunk groups exceeds the stored capacity threshold, the SCP returns to the originating SSP call routing-information routing the call to the terminating SSP using the interoffice trunk lines.

2. The telecommunications network of claim 1 wherein the SCP database stores data including telephone numbers used to allow dial-up access to network subscribers which can be cross-referenced to derive the trunk route index, the trunk route index identifying the Direct Route Primary Rate Interface to the terminating SSP associated with the network subscriber.

3. The telecommunications network of claim 2 wherein the SCP database stores a list of telephone numbers associated with the network subscriber, and wherein the SCP uses a called number contained in the call routing query received from the originating SSP to derive the trunk route index for the network subscriber.

4. The telecommunications network of claim 3 wherein the SCP uses the called number contained in the call routing query received from the originating SSP to derive the capacity threshold for the network subscriber.

5. A method of operating a telecommunications network, the method comprising:
receiving a call at an originating service switching point (SSP) from a user seeking dial-up access to a data network of a computer services provider;
at the originating SSP, generating a call routing query including a called number associated with the call;
communicating the call routing query from the originating SSP to a signal control point (SCP) of the telecommunications network, the SCP including an associated SCP database storing data for call routing;
at the SCP, based on the called number contained in the call routing query, identifying in the SCP database a customer for which the call is intended and a list of telephone numbers that are used for dial-up access to the customer and associated Direct Route Primary Rate Interface trunk groups coupling the originating SSP and a terminating SSP associated with the customer;

if, based on the list in the SCP database, a Direct Route Primary Rate Interface trunk group is associated with the computer services provider, returning to the originating SSP from the SCP call routing instructions for routing the call from the originating SSP to the Direct Route Primary Rate Interface trunk group; and if a Direct Route Primary Rate Interface trunk group is associated with the computer services provider, returning to the originating SSP from the SCP call routing instructions for routing the call to the terminating SSP when traffic to the Direct Route Primary Rate Interface trunk group exceeds a capacity threshold associated with the computer services provider.

6. The method of claim 5 further comprising:

at the SCP, determining the capacity threshold for the computer services provider based on the called number associated with the call and contained in the call routing query.

* * * * *